United States Patent [19]

Colliau

[11] Patent Number: 4,534,683

[45] Date of Patent: Aug. 13, 1985

[54] RECIPROCATING DRILL FEED CONTROL ROD HOLDING MEANS

[75] Inventor: Joel D. Colliau, Northville, Mich.

[73] Assignee: Ace Controls, Inc., Farmington, Mich.

[21] Appl. No.: 572,463

[22] Filed: Jan. 20, 1984

[51] Int. Cl.³ .............................................. B23B 47/22
[52] U.S. Cl. ........................................ 408/17; 188/67; 267/125
[58] Field of Search ................. 408/17, 10, 11; 279/4, 279/20; 267/125; 92/25; 188/67

[56] References Cited

U.S. PATENT DOCUMENTS

| | | | |
|---|---|---|---|
| 3,320,862 | 5/1967 | Wright | 92/25 |
| 3,609,054 | 9/1971 | Nyman | 400/17 |
| 3,643,765 | 2/1972 | Hanchen | 188/67 X |
| 3,680,970 | 8/1972 | Deschner | 408/17 |
| 3,812,766 | 5/1974 | Weiss | 92/25 X |
| 4,214,795 | 7/1980 | Kakuminato | 92/25 |
| 4,236,609 | 12/1980 | Carlsson | 188/67 |

FOREIGN PATENT DOCUMENTS 1479890  7/1977  United Kingdom ................. 408/17

Primary Examiner—William R. Briggs
Attorney, Agent, or Firm—Robert G. Mentag

[57] ABSTRACT

A holding or checking means for holding the control rod of a reciprocating drill feed control apparatus in position after each advancing movement of an automatic drilling machine during a "peck drilling" operation. The holding means includes a cylindrical body adapted to be fastened over the end of a drill feed control apparatus and with the control rod of the feed control apparatus extended through said body. A pair of pivotally mounted yoke arms are mounted on a cylindrical body and have semi-circular recesses adapted for friction holding engagement with the feed control rod to hold it in an advanced position when the reciprocating drill apparatus is retracted. The holding means includes a biasing means for biasing the yoke arms into friction engagement against the control rod. The holding means includes a fluid operated piston for selective movement into engagement with the yoke arms for releasing the yoke arms from a friction engagement with the control rod to permit the control rod to be moved by the feed control apparatus to an initial operating position.

4 Claims, 5 Drawing Figures

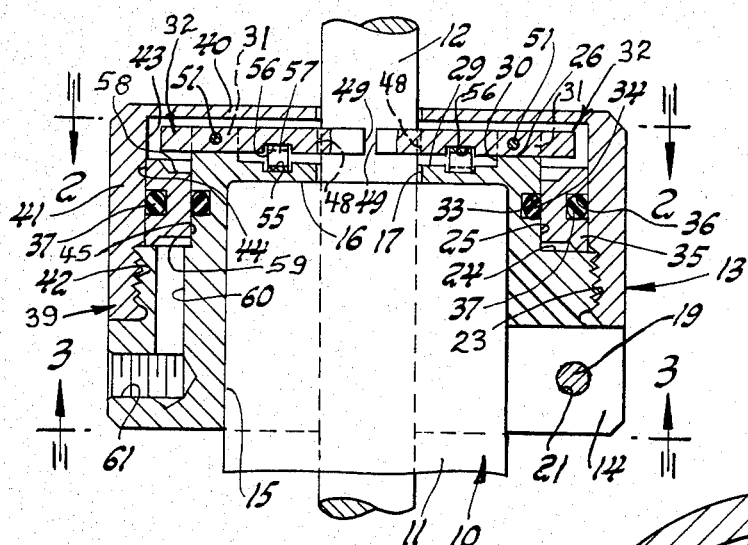
Fig. 1
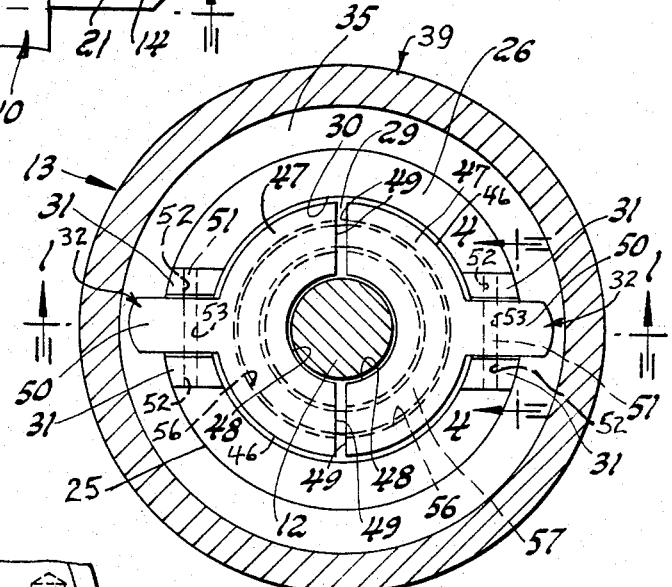
Fig. 4
Fig. 2
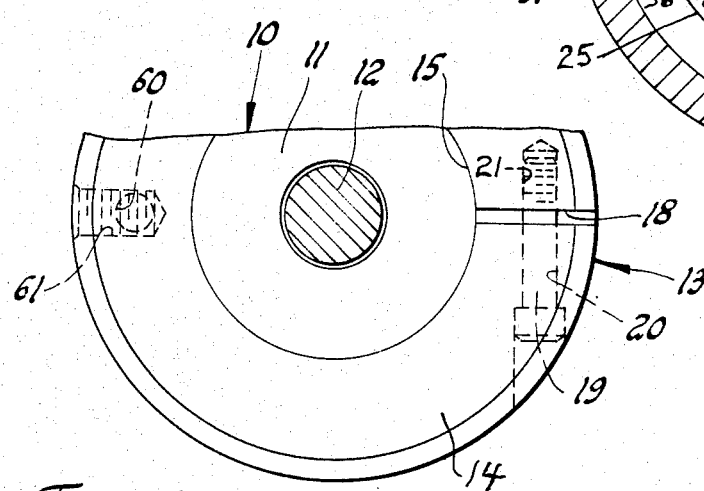
Fig. 3
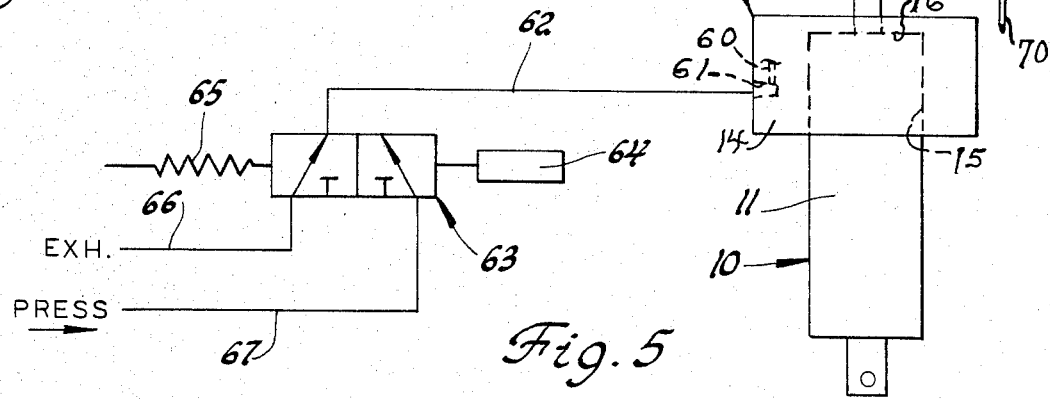
EXH.
PRESS
Fig. 5

RECIPROCATING DRILL FEED CONTROL ROD HOLDING MEANS

TECHNICAL FIELD

This invention relates generally to the machine tool art, and more particularly, to machine tools having a reciprocating action for feeding a tool, such as a drill, into a workpiece in advancing steps with alternate retractions of the tool to remove chips. The present invention is described as used in conjunction with a reciprocating drill constant velocity control apparatus for a reciprocating drill, and to provide a holding means for the feed control rod of the constant velocity control apparatus.

BACKGROUND ART

It is known in the drilling art, to provide automatic drilling machines with constant velocity speed control apparatus to regulate the speed of drill feeds. A constant velocity speed control apparatus controls the feeding speed of a drill, to prevent heavy impact of the drill when it is advanced into a workpiece. An automatic drilling machine which reciprocates a drill bit, to feed it in advancing steps, alternated with retraction steps to remove cuttings or chips, is described as doing "woodpecker drilling", or simply, "peck drilling". Heretofore, feed controls have been provided for automatic drills which control the advancing movement of a drill so that when it finishes a retraction movement and commences an advancing step, the drill will pick up the drilling action and start feeding into the workpiece at the same spot where the drill retracted from, to permit the chips, from the prior advancing drill movement, to be removed. A prior art feed control for an automatic drilling machine carrying out a "peck drilling" operation is described in U.S. Pat. No. 3,680,970. A disadvantage of the reciprocating drill feed control apparatus illustrated in said patent is that it is expensive to make because of the many parts involved. Another disadvantage is that in order to operate with a constant velocity speed control apparatus, the constant velocity speed control apparatus of said patent must be provided with a hardened rod, on which the feed control checking device is mounted.

DISCLOSURE OF THE INVENTION

In accordance with the present invention, a holding means, or checking means, is provided for holding the control rod of a reciprocating drill feed control apparatus in position after each advancing movement of an automatic drilling machine during a "peck drilling" operation. The feed control rod holding, or checking means, includes a holder body adapted to be releasably secured to the cylinder of a constant velocity speed control, and to be telescopically mounted over one end thereof, with the speed control rod extended through the holder body. The control rod holding means is provided with a pair of pivotally mounted retainer yoke members which are adapted to frictionally engage the speed control rod and hold it in the successive advanced positions of a drilling machine as it proceeds through a "peck drilling" operation. The control rod holding means includes biasing means for biasing the retainer yokes into a gripping position with the speed control rod, as well as means for releasing the retainer yokes from the speed control rod to permit the speed control rod move to its initial position.

BRIEF DESCRIPTION OF THE DRAWINGS

FIG. 1 is an elevational section view of a speed control rod holding means made in accordance with the principles of the present invention, taken along the line 1—1 of FIG. 2, and looking in the direction of the arrows.

FIG. 2 is a horizontal section view of the feed control rod holding means structure illustrated in FIG. 1, taken along the line 2—2 thereof, and looking in the direction of the arrows.

FIG. 3 is a fragmentary, bottom view of the structure illustrated in FIG. 1, taken along the line 3—3 thereof, and looking in the direction of the arrows.

FIG. 4 is a fragmentary, elevational view, partly in section, of the structure illustrated in FIG. 2, taken along the line 4—4 thereof, and looking in the direction of the arrows.

FIG. 5 is a schematic view of a constant velocity speed control apparatus provided with a feed control rod holding means made in accordance with the principles of the present invention, and showing a control circuit for the same.

BEST MODE OF CARRYING OUT THE INVENTION

Referring now the drawings, and in particular to FIGS. 1 and 5, the numeral 10 generally designates a constant velocity control apparatus, which provides precision hydraulic control for regulating the speed of drill feeds, and similar moving machinery and equipment. The constant velocity control apparatus includes an axially movable piston rod 12. The numeral 13 generally designates a reciprocating drill feed control rod holding means, made in accordance with the principles of the present invention, and constructed and arranged for holding the piston rod 12 of the constant velocity control apparatus 10 in position when an automatic drill is withdrawn from a workpiece for the purpose of getting rid of chips, so that when the drill moves back into the drill hole it will again engage the resistance or piston rod 12 at the same position as when the drill stopped drilling and backed up to remove the chips. A suitable constant velocity control apparatus 10 for use with the rod holding means 13 of the present invention is available from Ace Control, Inc., 23435 Industrial Park Drive, Farmington, Mich. 48024, under either model No. CVC-1 or CVC-2.

As shown in FIGS. 1, 2, 3 and 5, the control rod holding means 13 of the present invention includes a cylindrical body 14, which has a cylindrical chamber 15 formed therein and which extends longitudinally inward from the lower end thereof, as viewed in FIG. 1. The inner end of the cylindrical chamber 15 is indicated by the numeral 16 in FIGS. 1 and 5. The piston rod end of the cylindrical body 11 of the constant velocity control apparatus 10 is adapted to be slidably mounted in the cylindrical bore 15, with said piston rod end disposed in abutment with the inner end chamber wall 16. As shown in FIG. 1, an axial bore 17 is formed through the upper end of the body 14, for the sliding movement therethrough of the piston rod 12.

As shown in FIGS. 1 and 3, the feed control rod holding means body 14 is releasably clamped on the piston rod end of the constant velocity control cylindrical body 11, by a suitable machine screw 19. As shown in FIG. 1, a slot 18 of about 0.02 inches in width is formed through the lower end of the holding means body 14, and it extends longitudinally inward from the bottom of the body 14. The machine screw 19 extends through a bore 21, in the body 14, on one side of the slot 18 and into a threaded bore 21 on the other side of the slot 18. It will be obvious, that when the machine screw 19 is threaded into the threaded bore 21, and tightened, that the holding means body 14 will be releasably clamped on the cylindrical body 11 of the constant velocity control apparatus 10.

As shown in FIG. 1, the feed control rod holding means body 14 is provided with an integral intermediate reduced diameter portion, which is provided with a threaded outer periphery 23. The upper end of the intermediate threaded body portion 23 terminates at its upper end in a transverse shoulder 24, which in turn terminates at its inner end ith a further reduced diameter body upper end portion provided with a cylindrical, smooth outer surface 25, and the upper end of this portion is indicated by the numeral 26 in FIGS. 1 and 2.

A cylindrical recess 30 is formed in the upper end of the holding means body 14, and it extends longitudinally downward and terminates at the transverse wall indicated by the numeral 29.

As shown in FIGS. 1 and 2, two pairs of laterally spaced apart pivot posts or bosses 31 are integrally formed on the upper end 26 of the holding means body 14, in diametrical, oppositely disposed positions. A yoke member, generally indicated by the numeral 32, is pivotally mounted between each pair of pivot posts 31.

As shown in FIG. 1, a suitable O-ring seal 34 is operatively mounted in an annular groove 33, which is formed around the periphery of the upper portion of the holding means body 14, in the cylindrical surface 25. As shown in FIGS. 1 and 2, an annular or circular piston 35 is slidably mounted around the upper end portion of the holding means body 14. The inner periphery 45 of the annular piston 35 slidably engages the surface 25 of the upper end portion of the holding means body 14, and sealingly engages the O-ring seal 34. A suitable O-ring seal 37 is operatively mounted in an annular groove 36, which is formed around the outer periphery 44 of the annular piston 35.

As shown in FIGS. 1 and 2, a cylindrical cover or cap, generally indicated by the numeral 39, is operatively mounted on the upper end of the holding means body 14. The cover 39 includes a cylindrical side wall 41 and an integral top end transverse wall 40, which is perpendicular to the cylindrical side wall 41. The cover 39 is open at the lower end thereof, and formed therein is a chamber which is threaded along the lower end of the inner periphery, as indicated by the numeral 42. The threaded chamber wall periphery 42, is adapted to be threadably mounted on the threaded outer diameter 23 of the intermediate portion of the holding means body 14. As shown in FIG. 1, the annular piston 35 is normally seated on the annular shoulder 24. As shown in FIG. 1, the upper inner peripheral wall surface of the chamber inside of the cover 39 is a cylindrical smooth face surface 43, and it sealingly engages the O-ring seal 37.

As shown in FIG. 2, each of the yoke members 32 includes a semi-circular arm 47, which has a semi-circular piston rod engaging surface 48 formed on the inner end thereof. The yoke piston rod engaging surfaces 48 are diametrically opposed to each other. The inner end diametrical surfaces 49 of the yoke arms 47 are laterally spaced apart, as shown in FIG. 2. Each of the yoke members 32 has an integral radial and outwardly extended arm 50 that extends outwardly from each of the yoke arms 47. The outer surfaces 46 of each of the yoke arms 47 are arcuately formed and are spaced inwardly apart from the wall of the circular recess 30, which is formed in the upper end of the holding means body 14.

As shown in FIG. 2, each of the yoke integral arms 50 is positioned between one of the pair of pivot posts 31 and is pivotally mounted therebetween by means of a suitable pivot shaft 51. Each of the pivot pins 51 is loosely mounted through a bore 53 in its respective yoke arm 50, and has its ends mounted, as by a press fit, in the bores 52 in the adjacent pivot post 31.

As shown in FIGS. 1 and 2, a circular wave washer spring 57 is mounted between the yoke arms 47 and the upper end 29 of the holding means body 14. The circular spring 57 is seated in a groove 55 formed in the surface 29 of the holding means body 14, and in a position surrounding the piston rod 12. The upper end of the circular wave washer spring 57 is seated in grooves 56 formed in the lower side of the yoke arms 47.

As shown in FIG. 1, an annular recess 58 is formed in the upper end of the circular piston 35, around the inner periphery thereof. A similar recess 59 is formed on the lower end of the piston 35 along the inner periphery thereof.

As shown in FIGS. 1 and 3, a longitudinal bore 60 is formed along one side of the holding means body 14, with its upper end extending through the shoulder 24 and communicating with the space in which the piston 35 is mounted and with the annular recess 59 formed in the lower end of the piston 35. The lower end of the longitudinal bore 60 communicates with a transverse threaded bore 61 that extends outwardly to the outer periphery of the holding means body 14.

As shown in FIG. 5, the transverse threaded bore 61 functions as an inlet port which is connected by a conduit conduit 62 to a suitable directional control valve, generally indicated by the numeral 63. The directional control valve 63 is a conventional type valve and it is connected by a conduit 67 to a suitable source of pressurized air or other pressurized fluid. A suitable exhaust line 66 is also connected to the directional control valve 63. The directional control valve 63 is normally disposed in a first operating position shown in FIG. 5, and retained therein by a return spring 65. In the first operating position shown in FIG. 5 the pressurized air or other fluid is exhausted from the port 61. When it is desired to admit pressurized fluid, as for example pressurized air, into the port 61 for operating the holding means 13, the directional control valve 63 is shifted to the left, to a second operating position, by a suitable operator 64, which may be either a manual operator or an automatic operator such as a solenoid controlled operator.

In use, the holding means 13 of the present invention is slipped over the top of the constant velocity control or resistance member 10, with the piston rod 12 of the constant velocity control member 10 extending above the holding means 13, as shown schematically in FIG. 5. The constant velocity control apparatus 10 is mounted on the fixed portion of a drill head, when it is being used for controlling the feed or speed of a drill. As shown schematically in FIG. 5, when used with a reciprocating automatic drilling spindle 69, a bracket 68 is carried by the reciprocating drill spindle 69 and its outer end engages the outer end of the piston rod 12 of the constant velocity control apparatus 10. The reciprocating drill spindle 69 is provided with the usual drill 70. When the reciprocating drill spindle 69 moves downwardly, so as to move the drill 70 into a workpiece, the bracket 68 moves the piston rod 12 into the cylinder of the constant velocity control apparatus 10. When the drill spindle 69 is moved upwardly to remove chips from the drill 70, the feed control rod holding means 13 of the present invention retains the piston rod 12 in the position which the drill 70 has reached in its furtherest inward progress into a workpiece, during the advancing drilling movement. When the drilling spindle 69 is advanced in another drilling movement, the bracket 68 engages the piston rod 12 at the position corresponding to the end of the previous drilling movement, and it moves the piston rod 12 inwardly into the cylinder of the constant velocity control apparatus 10.

The holding means 13, of the present invention, functions with the piston rod 12 of the constant velocity control apparatus 10 to hold the piston rod 12 in the various advanced positions corresponding to the advanced positions of the drill 70 into a workpiece, and when the drilling operation is completed, pressurized air or other fluid is admitted into the holding means 13 to release the piston rod 12, and permit it to return to its starting or initial position for engagement by the bracket 68 at the beginning of another drilling operation.

FIG. 15 of the aforementioned U.S. Pat. No. 3,680,970 illustrates a conventional reciprocating drill spindle, which has a bracket for engaging the piston rod 12 of the constant velocity control apparatus shown in that patent. The feed control rod holding means 13 of the present invention functions to hold a piston rod 12 in repeated advanced positions to which it is moved by the bracket 68 of a retracting drill spindle head 69, by the following described action. When the bracket 68 moves the piston rod 12 downwardly or into the cylinder of the constant velocity control apparatus 10, the yoke arms 47 are pivoted downwardly around the pivot pins 51, to permit the piston rod to move downwardly past the yoke arms 47. However, when the drill head 69 goes into a retraction movement of the drill 70, the bracket 68 is also moved upwardly away from the piston rod 12 and the four lobe wave washer spring 57 then functions to pivot the inner ends of the yoke arms 47 upwardly about the pivot pins 51 to frictionally engage the semi-circular recesses 49 with the outer diameter or outer periphery of the piston rod 12. With each successive advancing movement of the drill spindle 69, the bracket 68 pushes the piston rod 12 downwardly into the cylinder of the constant velocity control apparatus 10, and with each retraction movement of the drill spindle 69 and the bracket 68, the yoke arms 47 are pivoted upwardly to frictionally engage the piston rod 12 in each advanced position and hold it in such position. As viewed in FIG. 1, the yoke arms 47 would pivot upwardly, with the left yoke arm 47, as viewed in FIG. 1, having its inner end pivoted counter-clockwise about its pivot shaft 51, and the inner end of the right yoke arm 47 being pivoted clockwise about its pivot shaft 51. The clearance between the semi-circular surfaces 48 on the inner ends of the yoke arm 47 and the outer periphery of the piston rod 12 is a close clearance. As for example, the bore formed by the semi-circular recesses 48 in one embodiment was 0.305 inches as compared to the outer diameter of the piston 12, which was 0.3120 inches.

After a succession of advancing and retracting movements of the drill spindle 69, in order to complete the drilling opration, the piston 12 rod is returned upwardly or outwardly of the cylinder of the constant velocity control apparatus 10, as viewed in FIG. 5, by operating the operator 64 of the direction control valve 63, to permit pressurized fluid to pass from the conduit 67 into the conduit 62 and into the port 61 and the passage 60, so as to move the piston 35 upwardly and pivot the yoke arms 47 downwardly to the level of horizontal inoperative position shown in FIG. 1, and permit the piston rod 12 to be moved outwardly by the hydraulic pressure in the constant velocity control apparatus 10.

INDUSTRIAL APPLICABILITY

The holding means of the present invention adapted for use on machine tools having a reciprocating action for feeding a tool, such as a drill. The holding means of the present invention functions to hold the control rod of a tool, as for example, a control rod of a reciprocating drill feed control apparatus in position, after each advancing movement of an automatic drilling machine during a "peck drilling" operation.

I claim:

1. A holding means for use with a reciprocating tool apparatus controlled by a constant velocity hydraulic feed control apparatus having a feed control rod, and wherein the holding means operates to hold the feed control rod in successive advanced positions during feeding of a tool into a workpiece by the reciprocating tool apparatus in alternate advancing and retracting steps, characterized in that, said holding means includes:

(a) a cylindrical body having a recess in one end for the releasable mounting reception of a constant velocity feed control apparatus, and having a recess end wall through which is slidably mounted the feed control rod which is engageable by the reciprocating tool apparatus during successive advancing tool movements for moving the feed control rod inwardly of the feed control apparatus against the hydraulic resistance created by the feed control apparatus;

(b) a pair of yoke members pivotally mounted in diametrically opposite positions on the cylindrical body end wall, and each yoke having a semi-circular feed control rod engaging recess disposed in close proximity to the periphery of the feed control rod;

(c) a biasing means mounted between said yoke members and said body end wall and biasing said yoke members into frictional holding engagement with the feed control rod to hold it in an advanced position when the reciprocating tool apparatus retracts a tool from a workpiece, and wherein said biasing means allows the yoke members to be pivoted into a released position from the feed control rod during an inward movement of the same, into the constant velocity hydraulic feed control apparatus during an advancing tool movement by the reciprocating tool apparatus;

(d) a cover member releasably mounted on the holding means cylindrical body and having an end wall with an opening through which the feed control rod extends;

(e) an annular piston cylinder formed between said cover and said cylindrical body, and having mounted therein an axially movable circular piston; and, (f) a passageway means in said cylindrical body for admittance of fluid under pressure into the piston cylinder beneath the circular piston to move it in one axial direction to move the yoke arms into a feed control rod releasing position, to permit the feed control rod to be moved to an initial operating position, outwardly of the constant velocity hydraulic feed control apparatus, to an initial position for the beginning of another succession of advancing and retracting tool operations by the reciprocating tool apparatus.

2. A holding means as defined in claim 1, characterized in that:
(a) said biasing means comprises a spring means.

3. A holding means as defined in claim 2, characterized in that:
(a) said spring means comprises a circular wave washer spring.

4. A holding means as defined in claim 1, characterized in that:
(a) each of said yoke members has a radical outwardly extended portion which is engageable by said circular piston during a feed control rod releasing engagement by said circular piston.

* * * * *